United States Patent Office 3,365,423
Patented Jan. 23, 1968

3,365,423
GLYCIDYL ETHERS AND CURABLE COMPOSITIONS CONTAINING SAME
Ralph F. Sellers, Somerset, Samuel G. Smith, Jr., Somerville, and Allison S. Burhans, Millington, N.J., assignors to Union Carbide Corporation, a corporation of New York
No Drawing. Filed July 5, 1966, Ser. No. 562,477
12 Claims. (Cl. 260—47)

This invention relates to glycidyl ethers and to curable compositions and cured products based thereon. More particularly, this invention relates to glycidyl ethers which can be cured to infusible products which are characterized by excellent compressive modulus, excellent compressive yield strength and by relatively high heat distortion temperatures.

The cured products of this invention, by reason of their excellent compressive modulus and excellent compressive yield strength, are highly attractive for use as binders in filament wound, deep sea submergence vehicles and structural laminates which are to be subjected to high compressive forces. Also, the cured products of this invention, characterized by relatively high heat distortion temperatures, can be advantageously used as binders in structural laminates which are to be exposed to relatively high temperatures over prolonged periods of time.

The present invention provides cured products which are characterized by a compressive modulus (ASTMD–695–61) in excess of about 675,000 p.s.i., a compressive yield strength (ASTMD–695–61) in excess of about 25,000 p.s.i. and a heat distortion temperature (ASTMD–640–56) in excess of about 175° C.

The glycidyl ethers of this invention can be represented structurally by Formulas I and II which are given below.

Formula I

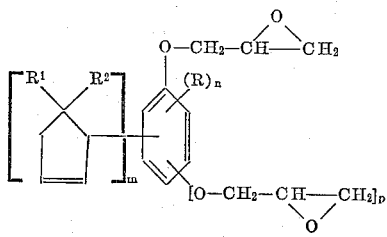

wherein R can be an alkyl radical, generally containing a maximum of 12 carbon atoms, halogen, i.e., chlorine, bromine, iodine or fluorine or alkoxy, generally containing a maximum of 12 carbon atoms, $R^1$ and $R^2$, which can be the same or different, are hydrogen or alkyl radicals and when alkyl radicals generally containing 1 to 6 carbon atoms inclusive, and preferably containing 1 to 4 carbon atoms inclusive, $m$ is an integer having a value of 1 to 4 inclusive, $n$ is an integer having a value of 0 to 3 inclusive, $p$ is an integer having a value of 1 to 3 inclusive and the maximum value of $m+n+p=5$.

Formula II

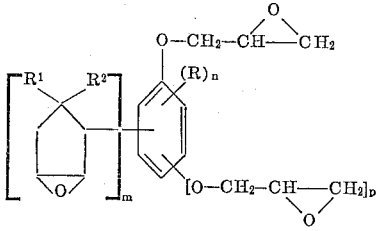

wherein all of the variables are as defined in Formula I.

Particularly desirable compounds are those falling within the scope of Formulas I and II wherein $n$ is zero, $p=1$ and $m=1$ to 3 inclusive.

Preparation of compounds falling within the scope of Formula I is conveniently accomplished by reacting an epihalohydrin with a compound falling within the scope of Formula III wherein all of the variables are as defined in Formula I.

Formula III

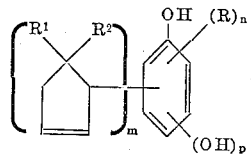

The reaction of an epihalohydrin with compounds falling within the scope of Formula III can be conducted by reacting a mixture containing these compounds in a manner as described in U.S. Patent 2,943,095 to Alford G. Farnham and also as further described in this specification. In this reaction, each hydrogen of each phenolic hydroxyl group is replaced, theoretically, by a glycidyl radical.

Compounds falling within the scope of Formula III can be conveniently prepared according to the procedure described in British Patent 741,466 and also according to the procedure described in a book by George A. Olah entitled "Friedel-Crafts and Reactions," Part I (Chapter XV, Interscience Publishers, 1964), by reacting a cyclopentadiene having the formula:

Formula IV

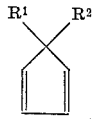

wherein $R^1$ and $R^2$ are as defined in Formula I with a phenol having the formula:

Formula V

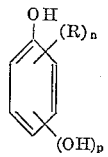

wherein all of the variables are as previously defined.

Specific phenols falling within the scope of Formula V are: pyrocatechol, hydroquinone, resorcinol and the like; alkylated dihydroxy phenols such as 1,3-dihydroxy-4-methylbenzene, 1,2-dihydroxy-4-hexylbenzene and the like; alkoxylated dihydroxy phenols such as 1,4-dihydroxy-3-n-hexoxybenzene and the like; halogenated dihydroxy phenols such as 1,2-dihydroxy-4-chlorobenzene and the like; trihydric phenols such as phloro-5-chloroglucinol, pyrogallol and the like.

Compounds falling within the scope of Formula II can be conveniently prepared by epoxidizing compounds falling within the scope of Formula I utilizing peracetic acid, in a manner described in this specification, and also in a manner as described in U.S. Patent 2,750,395 to B. Phillips et al.

Glycidyl ethers of this invention can be cured to infusible products by being heated at elevated temperatures, generally on the order of about 50° C. to about 200° C. Since the self-cure of these glycidyl ethers, at elevated temperatures, usually requires more than a day, it is customary to add curing agents thereto, prior to the heating cycle, in order to effect a cure in a reasonable period of time. Any of the epoxy curing agents can be used for this purpose. The curing agents can be catalysts, that is, compounds which primarily catalyze the curing reaction, or hardeners, compounds which react with the glycidyl ethers.

Suitable hardeners are the polyamines (described in U.S. Patent 2,935,488), the polycarboxylic acids and anhydrides thereof (described in U.S. Patent 2,921,925 to B. Phillips et al.).

For purposes of stoichiometric calculations one epoxy group is deemed to react with one amino hydrogen atom; one epoxy group is deemed to react with one carboxyl group and one epoxy group is deemed to react with one anhydride group.

Particularly desirable hardeners for purposes of this invention are the aromatic amine hardeners. Cured products of curable compositions containing aromatic amine hardeners have exceptionally high compressive modulus and yield strength as well as relatively high heat distortion temperatures.

Among suitable aromatic amines are those having 2 or more and preferably at least 3 amino hydrogen atoms per molecule, as for example, those having the formula:

Formula VI

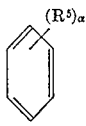

wherein each $R^5$, which can be the same or different, is halogen, e.g., chlorine, bromine and the like; primary amino groups; or hydrocarbon radicals, generally containing 1 to 20 carbon atoms inclusive and preferably containing 1 to 10 carbon atoms inclusive and $\alpha$ is a whole number having a value of 1 to 6 inclusive; provided the compound contains 2 or more amino hydrogen atoms per molecule.

Illustrative of hydrocarbon radicals for $R^5$ are alkyl radicals, generally containing 1 to 20 carbon atoms inclusive and preferably containing 1 to 10 carbon atoms inclusive such as methyl, ethyl, n-propyl, isopropyl, n-butyl, n-decyl and the like; cycloalkyl radicals, generally containing 3 to 20 carbon atoms inclusive and preferably containing 3 to 10 carbon atoms inclusive, such as cyclopentenyl, allyl and the like; halogenated alkyl and saturated aliphatic hydrocarbon radicals, generally containing from 2 to 20 carbon atoms inclusive and preferably containing 2 to 10 carbon atoms inclusive, such as cyclopentyl, allyl and the like; halogenated alkyl and cycloalkyl radicals, generally containing 1 to 20 carbon atoms inclusive and preferably containing 1 to 10 carbon atoms inclusive, such as chloroethyl, bromoethyl, fluoroethyl, 2-chloro-n-propyl, 2-bromo-n-propyl, 2-chloro-n-butyl and the like; alkoxy and aryloxy substituted alkyl and cycloalkyl radicals, generally containing 2 to 20 carbon atoms inclusive and preferably containing 2 to 10 carbon atoms inclusive such as methoxymethyl, ethoxyethyl, 3-ethoxy-n-propyl, 4-ethoxy-n-butyl, 2-methoxycyclohexyl, phenoxymethyl, 2-phenoxyethyl and the like; aryl radicals, generally containing 6 to 20 carbon atoms inclusive and preferably containing 6 to 18 carbon atoms inclusive, such as phenyl, tolyl and the like, as well as halogenated aryl radicals, such as p-chlorophenyl, p-bromophenyl, p-fluorophenyl, p-iodophenyl and the like; alkoxy and aryloxy substituted aryl radicals, generally containing 7 to 20 carbon atoms inclusive and preferably containing 9 to 18 carbon atoms inclusive, such as p-methoxyphenyl, p-ethoxyphenyl, p-n-propoxyphenyl and the like; alkaryl radicals, such as o-methylphenyl, p-ethylphenyl, p-n-propylphenyl and the like; also, those hydrocarbon radicals, as described, which are substituted with one or more amino groups.

Exemplary of such aromatic amines are the following: o-phenylenediamine, p-phenylenediamine, m-phenylenediamine, benzidine, o-toluidine, o-dianisidine and the like.

Particularly desirable aromatic amines falling within the scope of Formula VI are those amines having the formula:

Formula VII

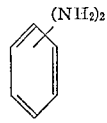

Among other suitable aromatic amines are those having the formula:

Formula VIII

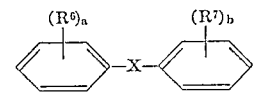

wherein $R^6$ and $R^7$ are as defined for $R^5$, $a$ and $b$ are whole numbers having a value of 1 to 5 inclusive and X is a divalent radical, as for example:

$$-\underset{\underset{O}{\|}}{C}-, \ -O-, \ -S-, \ -SO_2-, \ -S-S-$$

or a divalent hydrocarbon radical, wherein the amine contains at least two primary amino groups per molecule, as described, and these do not necessarily have to be attached to the same aromatic nucleus.

Illustrative of suitable divalent hydrocarbon radicals for X are the following divalent, aliphatic hydrocarbon radicals: alkylene radicals, generally containing 1 to 6 carbon atoms inclusive and preferably containing 1 to 4 carbon atoms inclusive, such as methylene, ethylene, trimethylene and the like; alkylidene radicals, generally containing 2 to 6 carbon atoms inclusive and preferably containing 2 to 4 carbon atoms inclusive, such as ethylidene, propylidene, isopropylidene and the like.

Particularly desirable aromatic amines falling within the scope of Formula VIII are those aromatic amines having the formula:

Formula IX

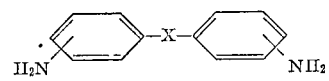

wherein X is sulfone ($SO_2$) or a divalent hydrocarbon radical, as previously described.

Also suitable for purposes of this invention are the aromatic amines produced on reacting aniline with formaldehyde. Specific aromatic amines falling within the scope of Formula IX are the following: 4,4'-diaminodiphenylmethane, 4,4'-diaminodiphenylsulfone, bis(4-amino-2-chlorophenyl)methane and the like.

In those instances in which a hardener is used, it is generally employed in amounts of about 40 percent of stoichiometric to about 60 percent in excess of stoichiometric. As a rule, it is preferred to use about stoichiometric amounts.

Illustrative of suitable catalysts which can be used to initiate the self-cure of the glycidyl ethers of this invention are tertiary amines such as benzyldimethylamine and the like, quaternary ammonium compounds, boron trifluoride complexes such as boron trifluoride etherate complex, boron trifluoride monoethylamine complex and the like, uranyl nitrate, uranyl esters and the like.

In those instances wherein a catalyst is used, it is employed in at least catalytic amounts, that is, amounts sufficient to initiate the self-cure of the glycidyl ethers. Generally the catalyst is used in amounts of from about 0.2 to about 5 percent by weight and preferably from about 0.5 to about 2 percent by weight based on the weight of the glycidyl ether. More than about 5 percent by weight of catalyst can be used but this does not materially decrease the time of the curing cycle and is, therefore, economically undesirable.

The glycidyl ethers of this invention, which contain more than one epoxy group per molecule, can be used in every application now served by epoxies, as for example, in epoxy tooling and abrasive wheel applications, in electrical relays, gears and bearings. Also, the glycidyl ethers can be used in molding and casting applications to form shaped articles of desired form.

Particularly desirable applications of the glycidyl ethers of this invention is in the preparation of laminates and filament wound structures using aromatic amines as hardening agents. In producing a composition suitable for this purpose the glycidyl ether in combination with an aromatic amine hardener is dissolved in any suitable organic solvent to form a solution having a solids content of about 30 to about 70 percent by weight. As a rule, the organic solvent used is a ketone, such as methyl ethyl ketone, diisopropyl ketone and the like. This solution is then used to impregnate, by any suitable method, for example, dipping, spraying and the like any desired material, for instance, glass cloth, glass filaments, carbon cloth, carbon filaments, nylon filaments, metal fibers, paper and the like. The solvent is removed from the impregnated material and the impregnated material is then formed into a desired shape and the composition cured to its infusible state.

The temperature to which each impregnated material is heated in order to effect a cure of the composition will, of course, vary and depend, in part, upon the exact formulation of the composition. As a rule, this temperature is in the range of about 100° C. to about 200° C. for a period of time ranging from about 1 to 6 hours. In the production of laminates, it is also customary to subject the impregnated material to elevated pressures.

The following examples further illustrate the present invention and are not intended to limit the scope thereof in any manner.

EXAMPLE 1

This example illustrates the preparation of a glycidyl ether having the formula:

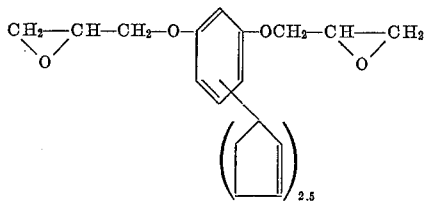

857 grams of 1,3-dihydroxypoly(cyclopentenyl-2)benzene and 2458 grams of epichlorohydrin were admixed in a reaction mixture containing 498 grams of ethyl alcohol. The temperature of the mixture was maintained at 60° C. to 65° C. while 638 grams of a 50 percent aqueous solution of sodium hydroxide were added thereto according to the following schedule:

64 grams after 1 hour,
64 grams after 1½ hours,
446 grams after 2½ hours,
64 grams after 3½ hours.

The excess epichlorohydrin, alcohol and water were distilled off to conditions of 125° C. at 55 mm. Hg pressure. The organic portion of the residue was dissolved in 1660 grams of methyl isobutyl ketone and the ketone solution was then water-washed until free of salts and residual alkali. The glycidyl ether was recovered by distilling off the ketone.

Analysis: Yield=1187 grams of a soft solid. Epoxy assay=209.3 grams/gram equivalent.

EXAMPLE 2

This example illustrates the preparation of a compound having the formula:

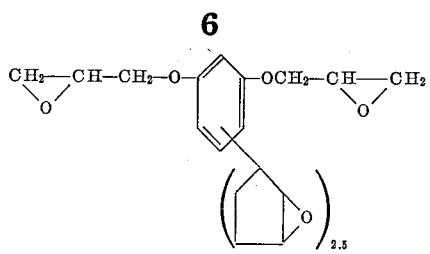

117 grams (0.635 equivalent) of the glycidyl ether of Example 1 was placed in a flask which was fitted with a stirrer and external cooling means and 206 grams (0.635 equivalent) of a 23.4 percent solution of peracetic acid in ethyl acetate was added dropwise into the flask over a period of 25 minutes. During the addition and for 2 hours thereafter, the reaction solution was maintained at a temperature of about 35° C. At the end of this period an analysis for peracetic acid indicated that 97.8 percent of the theoretical peracetic acid had been consumed. The reaction solution was then added dropwise to a still kettle containing ethylbenzene which was refluxing under a pressure of 25 mm. Hg. During the addition, enough material was being distilled so that a heat temperature of 30° C.–32° C. was maintained. After this addition, a low boiling material was distilled up to the boiling point of pure ethylbenzene. The residue product, which analyzed 0.14 percent acetic acid, was then purified in a molecular still.

Analysis: Nature of product=soft solid. Epoxy assay=119.7 grams/gram equivalent.

EXAMPLE 3

This example illustrates the excellent properties of the compounds of this invention.

119.7 grams of the compound of Example 2 were admixed at 100° C. with a stoichiometric amount of m-phenylenediamine (27 grams) and poured into test tubes to form rod-like castings ⅝ inch in diameter and 5 inches in length utilizing the following cure cycle:

18 hours at 100° C.,
6 hours at 160° C.,
2 hours at 200° C.

Cylinders ½ inch in diameter and 1 inch in length were then machined from these castings and subjected to tests which are indicated below.

Compound—Glycidylether of Example 2:
    Compressive modulus _____p.s.i._ 688,000
    Compressive yield strength _____p.s.i._ 29,600
    Heat distortion temperature _____° C._ 190

What is claimed is:
1. An epoxide having the formula:

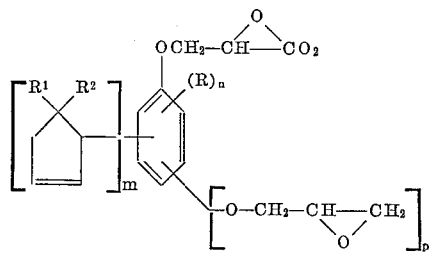

wherein R is a member selected from the group consisting of an alkyl radical having a maximum of 12 carbon atoms, an alkoxy radical having a maximum of 12 carbon atoms and halogen; $R^1$ and $R^2$ are members selected from the group consisting of hydrogen and an alkyl radical having 1 to 6 carbon atoms inclusive, $m$ is an integer having a value of 1 to 4 inclusive, $n$ is an integer having a value of 0 to 3 inclusive, $p$ is an integer having a value of 1 to 3 inclusive and the maximum value of the sum of $m$, $n$ and $p$ is 5.

2. An epoxide as defined in claim 1 wherein $n=0$, $p=1$ and $m=1$ to 3 inclusive.

3. An epoxide as defined in claim 1 which has the formula:

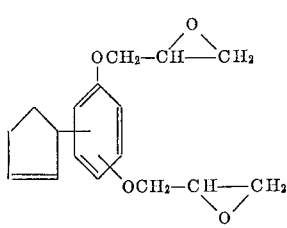

4. An epoxide having the formula:

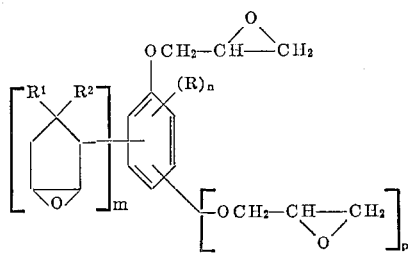

wherein R, R¹, R², $m$, $n$, $p$ and the sum of $m$, $n$ and $p$ are as defined in claim 1.

5. An epoxide as defined in claim 4 wherein $n=0$, $p=1$ and $m=1$ to 3 inclusive.

6. An epoxide as defined in claim 4 which has the formula:

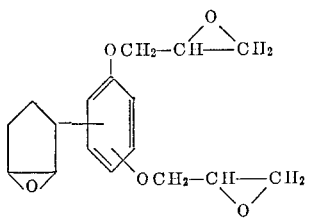

7. The cured product of the epoxide defined in claim 1.
8. The cured product of the epoxide defined in claim 4.
9. A curable composition comprising an epoxide curing agent and the epoxide defined in claim 1.
10. A curable composition comprising an epoxide curing agent and the epoxide defined in claim 4.
11. A curable composition as defined in claim 9 wherein the curing agent is an aromatic amine having more than 2 amino hydrogen atoms per molecule.
12. A curable composition as defined in claim 10 wherein the curing agent is an aromatic amine having more than 2 amino hydrogen atoms per molecule.

No references cited.

WILLIAM H. SHORT, *Primary Examiner.*

T. D. KERWIN, *Assistant Examiner.*

UNITED STATES PATENT OFFICE
CERTIFICATE OF CORRECTION

Patent No. 3,365,423  January 23, 1968

Ralph F. Sellers et al.

It is certified that error appears in the above identified patent and that said Letters Patent are hereby corrected as shown below:

Column 3, line 46, beginning with "such" cancell all to and including "as cyclopentyl," in line 51, same column 3, and insert -- such as cyclohexyl and the like; unsaturated alicyclic and unsaturated aliphatic hydrocarbon radicals, generally containing from 2 to 20 carbon atoms inclusive and preferably containing 2 to 10 carbon atoms inclusive, such as cyclopentenyl, --.

Signed and sealed this 2nd day of September 1969.

(SEAL)
Attest:

Edward M. Fletcher, Jr.
Attesting Officer

WILLIAM E. SCHUYLER, JR.
Commissioner of Patents